United States Patent [19]
Löfmark

[11] Patent Number: 5,446,728
[45] Date of Patent: Aug. 29, 1995

[54] METHOD AND ARRANGEMENT FOR USE IN THE ELIMINATION OF ECHOES IN A SUBSCRIBER LINE CIRCUIT

[75] Inventor: Bengt G. Löfmark, Skärholmen, Sweden

[73] Assignee: Telefonaktiebolaget LM Ericsson, Stockholm, Sweden

[21] Appl. No.: 783,866

[22] Filed: Oct. 29, 1991

[30] Foreign Application Priority Data

Nov. 16, 1990 [SE] Sweden ................................ 9003661

[51] Int. Cl.$^6$ ............................................. H04B 3/20
[52] U.S. Cl. ................................... 370/32.1; 379/410
[58] Field of Search ................................ 370/27–31,
370/32.1, 100.1; 379/406–411, 377; 381/93, 94;
333/18, 28 R; 375/27, 28, 118, 106; 341/62;
364/724

[56] References Cited

U.S. PATENT DOCUMENTS

| | | | |
|---|---|---|---|
| 4,270,027 | 5/1981 | Agrawal et al. | 379/377 |
| 4,528,551 | 7/1985 | Agrawal et al. | 375/27 |
| 4,577,309 | 3/1986 | Barazeche et al. | 370/32.1 |
| 4,621,356 | 11/1986 | Scipione | 370/32.1 |
| 4,989,221 | 1/1991 | Qureshi et al. | 370/32.1 |
| 4,995,030 | 2/1991 | Helt | 370/32.1 |
| 5,018,134 | 5/1991 | Kokubo et al. | 370/32.1 |
| 5,155,743 | 10/1992 | Jacobs | 375/28 |

FOREIGN PATENT DOCUMENTS

1-256821 10/1989 Japan.
2214378 8/1989 United Kingdom.

OTHER PUBLICATIONS

Eriksson and Svensson, "Line Circuit Component SLAC for AXE 10," Ericsson Review No. 4, 1983, pp. 186–191.

P. Defraeye et al., "A 3-μM CMOS Digital Codec With Programmable Echo Cancellation and Gain Setting," *IEEE Journal of Solid State Circuits*, SC-20, No. 3, Jun. 1985, pp. 676–687.

Primary Examiner—Douglas W. Olms
Assistant Examiner—Dang Ton
Attorney, Agent, or Firm—Burns, Doane, Swecker & Mathis

[57] ABSTRACT

The invention relates to echo elimination in a subscriber line circuit having digital signal processing. Echo elimination is effected with the aid of a digital balance filter which is connected in an interface where the sampling frequency, e.g. 16 kHz, is higher than the original sampling frequency, e.g. 8 kHz, of transmitted signals. The requisite size of the balance filter can be reduced by sampling the filter at the same frequency, e.g. 8 of kHz, as the original sampling frequency of the transmitted signals.

2 Claims, 2 Drawing Sheets

METHOD AND ARRANGEMENT FOR USE IN THE ELIMINATION OF ECHOES IN A SUBSCRIBER LINE CIRCUIT

TECHNICAL FIELD

The present invention relates to a method and to an arrangement for decreasing the necessary size of a digital filter used for echo elimination in a subscriber line circuit having digital signal processing, in which echo elimination is effected in an interface where the clock frequency is higher than the original sampling frequency of transmitted signals.

BACKGROUND ART

A subscriber line circuit with echo elimination is described in the article "Line Circuit Component SLAC for AXE 10" published in Ericsson Review, No. 4, 1983, pages 186–191. Included among other things in the receiving branch of the line circuit is a lowpass filter and a so-called interpolation filter in which the clock frequency, i.e. the sampling frequency, is increased. Included in the transmission branch, among other things, is a so-called decimation filter in which the clock frequency is reduced, and a bandpass filter having an upper limit frequency of 3.4 kHz. Echo elimination is effected with the aid of a digital filter, a so-called balance filter, in an interface between the input of the interpolation filter and the output of the decimation filter. The balance filter coefficients are determined, in a known manner, so that its transfer function, as far as possible, will equal the transfer function of the echo path giving rise to the echo. Thus, the echo path includes the interpolation filter and the decimation filter, among others.

The information signals transmitted are originally sampled at a sampling frequency of 8 kHz. The clock frequency, however, is 16 kHz in the interface where the balance filter is connected, due to the fact that this frequency is increased upstream of the lowpass filter in the receiving branch and is decreased downstream of the bandpass filter in the transmission branch. It may appear disadvantageous to connect the balance filter at a point where the clock frequency is 16kHz instead of 8 kHz. A higher clock frequency namely requires a longer and more calculation-demanding filter than at a lower frequency, with the assumption that the filter impulse response shall have a given length. In itself, it is possible to connect the balance filter upstream of the lowpass filter in the receiving branch and downstream of the bandpass filter in the transmission branch in an interface where the clock frequency is 8 kHz. This would mean, however, that the lowpass filter and the bandpass filter, and also gain regulators and equalizing filters coupled in the receiving branch and in the transmission branch, would be included in the echo path. This would make it necessary to use a still longer balance filter than when the filter is coupled at a point where the clock frequency is 16 kHz.

Another example of a subscriber line circuit with echo elimination is known from the article "A 3-μm CMOS Digital Codec with Programmable Echo Cancellation and Gain Setting", published in IEEE Journal of Solid State Circuits, Vol. SC-20, No. 3, June 1985, pages 679–687. Transmitted signals are originally sampled at the frequency of 8 kHz. In this circuit, the clock frequency has been increased to 32 kHz in the interface where the balance filter is connected. A clock frequency of 16 kHz is used, however, for the filter. Because the clock frequency of the filter is 16kHz , it is possible to use a shorter and less calculating-demanding filter than when a clock frequency of 32 kHz has been used for the filter.

DISCLOSURE OF THE INVENTION

A object of the present invention is to provide a method and an arrangement for decreasing the necessary size of a balance filter connected in an interface with higher clock frequency than the original sampling frequency of the transmitted signals. This is achieved by clocking the balance filter at the same frequency as the original sampling frequency of the transmitted signals.

The characteristic features of the invention are set forth in the following claims.

As a result of the reduction in clock frequency on the input side of the balance filter, the input signal of the filter will differ slightly from the signal which passes out to the echo path. This can be compensated for, by slightly changing the transfer functions of the filter by changing the filter coefficients in relation to the values that they would have had if the clock frequency over the filter had not been reduced.

BRIEF DESCRIPTION OF THE DRAWINGS

The invention will now be described in more detail with reference to the accompanying drawings, in which.

BEST MODE OF CARRYING OUT THE INVENTION

Figure 1:
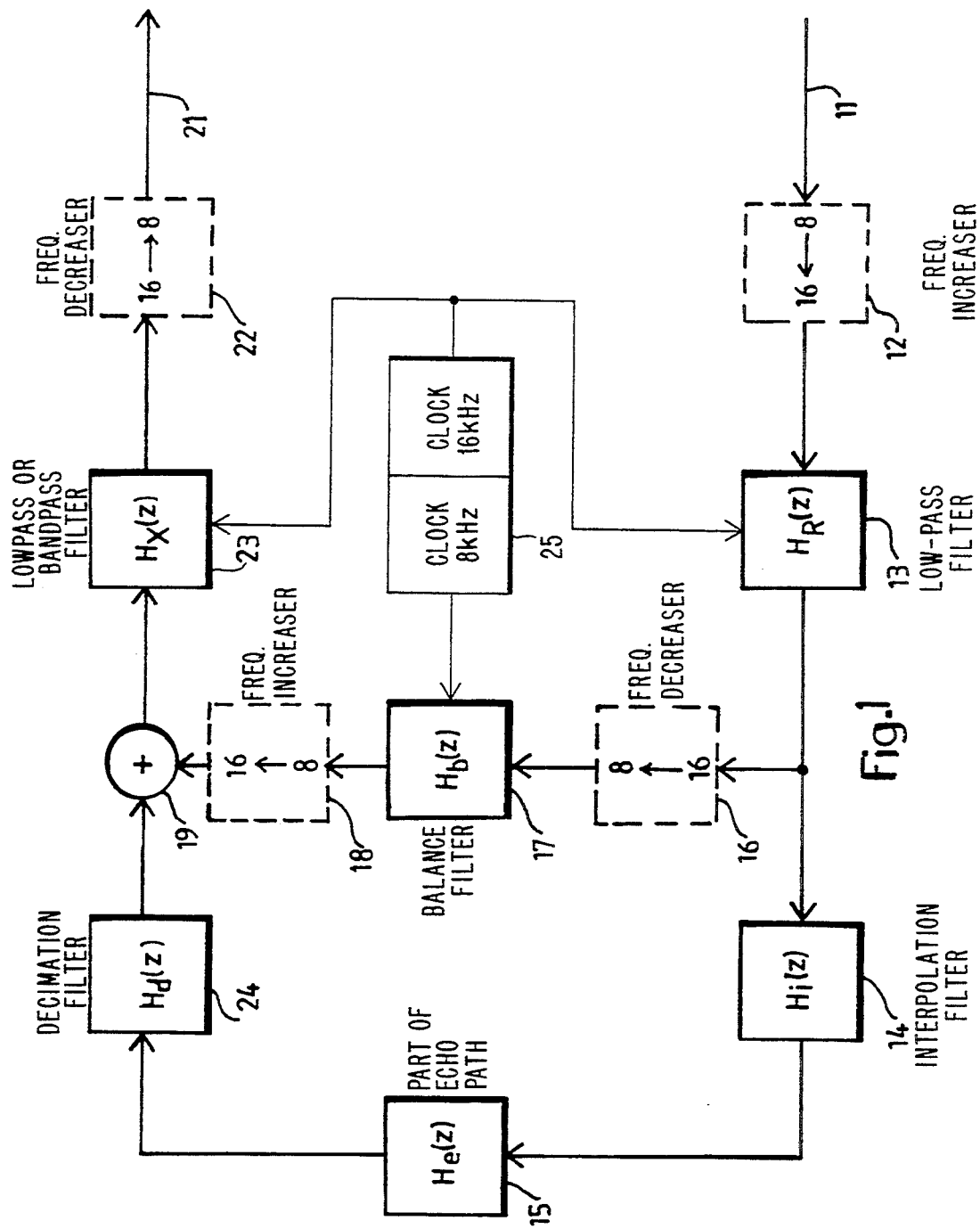
FIG. 1 is a block schematic illustrating by way of example a subscriber line circuit provided with an inventive arrangement.

FIG. 1 illustrates an exemplifying embodiment of a block schematic over a subscriber line circuit provided with an inventive arrangement. The block schematic, however, includes solely those blocks which are essential to the following description of the present invention. Reference numeral 11 identifies the receiver branch of the line circuit, while reference numeral 21 identifies the transmitter branch of said circuit.

A clock signal generator 25 is illustrated in FIG. 1. The clock signal generator 25 generates clock pulses for operating the various components at respective frequencies. For instance, some components are operated at 16kHz and others at 8 kHz , as described below. The clock signal generator 25 may be in the form of a conventional 32 kHz oscillator coupled to various divider circuits for providing the respective clock rates. The different clock rates include, for instance, a clock rate of 16kHz used as a sampling frequency in block 12 for twice sampling the 8 kHz received speech signals (received at the receiver branch 11 ) to provide the 16kHz sampled signal to interpolation filter 14, as explained below. The clock pulses should not be confused with the sampled speech signal derived from the originally received speech signal. Signals which arrive at the receiver branch 11 are assumed to be PCM-signals which are sampled at the frequency 8 kHz. The sampling frequency, i.e. the clock frequency, is increased in a block 12 to 16kHz. This block has been drawn in broken lines, since such an increase in sampling frequency need not, in practice, be effected in a single device in the actual meaning of the word, but can be effected by reading each sample twice. Also included in the receiver branch is a lowpass filter 13 having the transfer function $H_R(z)$ and having a cut-off frequency equal to 3.4 kHz, and an interpolation filter 14 in which the sampling frequency is further increased, in a known manner. The transfer function of the interpolation filter is referenced $H_i(z)$. A block 15 having the transfer function $H_e(z)$ represents the major part of the echo path. This path includes, among other things, a two-wire to four-wire junction and a two-wire line.

The transmission branch 21 includes a decimation filter 24 having the transfer function $H_d(z)$, in which the sampling frequency is decreased to 16 kHz, a lowpass filter or bandpass filter 23 having the transfer function $H_X(z)$ and having a cut-off frequency equal to 3.4 kHz, and a block 22 for decreasing the sampling frequency to 8 kHz. The block 22 corresponds to the block 12 in the transmission branch, but decreases the sampling frequency instead of increasing the same. This is effected by excluding every second sample.

A balance filter 17 having the transfer function $H_b(z)$ and a subtraction means 19 are connected in an interface from the input of the integration filter 14 to the output of the decimation filter 24, where the sampling frequency is 16 kHz, in a known manner. In accordance with the present invention, however, a block 16 in which the sampling frequency is decreased to 8 kHz is connected upstream of the input of the balance filter 17, and a block 18 in which the sampling frequency is again raised to 16kHz connected downstream of the output of the balance filter. The block 16 and 18 have been drawn in broken lines, since similar to the block 12 and 22, these blocks need not, in practice, comprise separate devices in the actual meaning of the word.

Because the sampling frequency in the balance filter is 8 kHz, it is possible to use a shorter filter, i.e. a filter with a smaller number of taps, than when the clock frequency is 16kHz. This applies provided that the length of the impulse response shall remain unchanged. Furthermore, considerably fewer calculating operations per second need be carried out, above all multiplications. It can be mentioned by way of example that the sampling frequency of 16kHz requires a filter having 9 taps, which means that $9 \cdot 16 \cdot 10^3 = 144000$ calculating operations per second need to be carried out. The sampling frequency of 8 kHz requires a filter having solely five taps, meaning $5 \cdot 8 \cdot 10^3 = 40000$ calculating operations per second. The reason why only five taps are required with the lower sampling frequency as compared with nine taps at the higher frequency is because the value at the first tap in a filter is not delayed. Thus, in the case of a filter with nine taps, eight taps are delayed. Eight delays at 16kHz corresponds in time to four delays at 8 kHz.

Alternatively, a longer impulse response, and thereby improved echo cancellation, is obtained with a balance filter of given length when the clock frequency across the filter is 8 kHz instead of 16 kHz.

The PCM-signals which arrive at the receiver branch 11 in accordance with the illustrated embodiment are sampled at the frequency of 8 kHz and are defined only within the frequency range of 0–4 kHz. A balance filter having the sampling frequency of 16kHz therefore has an unnecessary degree of freedom, since it is able to process signals within the frequency band of 0–8 kHz. The reason why it is possible to use the same sampling frequency in the balance filter as the original sampling frequency of the transmitted signal, i.e. with 8 kHz, is explained below.

Assume that a signal having the frequency f kHz arrives at the receiver branch 11. When the sampling rate is doubled in the block 12 from 8 to 16kHz, there is formed by the received signal a composite signal which includes both a baseband component of frequency f kHz and a modulated component of frequency 8-f kHz. The modulated component is heavily attenuated in the lowpass filter 13, since the frequency is higher than 4 kHz, which in turn is because the frequency f is lower than 4 kHz. Because this increase in sampling rate is effected by reading each sample twice, the composite signal will also be lowpass filtered with a transfer function equal to $(1+z^{-1})/2$. The sampling frequency is halved upstream of the balance filter input, by using only every second sample as the filter input value. Lowering of the sampling frequency corresponds in the frequency plane by demodulation of the component having the frequency 8-f kHz back to the frequency of f kHz, and by thereafter adding said component to the baseband component, which constantly has this frequency.

Consequently, doubling and halving of the sampling frequency with associated modulation and demodulation achieves the same effect as though the received signal had been passed to the balance filter through two branches, the signals obtained from these branches being added together prior to reaching the filter. The one branch comprising a block having the transfer function $(1+z^{-1})/2$ and the lowpass filter 13 having the transfer function $H_R(z)$. The block having the transfer function $(1+z^{-1})/2$ represents the lowpass filtering that occurs when halving the sampling frequency. The other block comprises two blocks similar to the blocks of the first branch, but with the difference that the z-variable has been replaced by a $-z$ variable. This latter is explained by the fact that the frequency 8-f is equivalent to the frequency f-8, which is corresponded by $-z$ in the z-plane.

As described below with reference to FIG. 2, a corresponding division into two branches takes place downstream of the balance filter.

Figure 2:
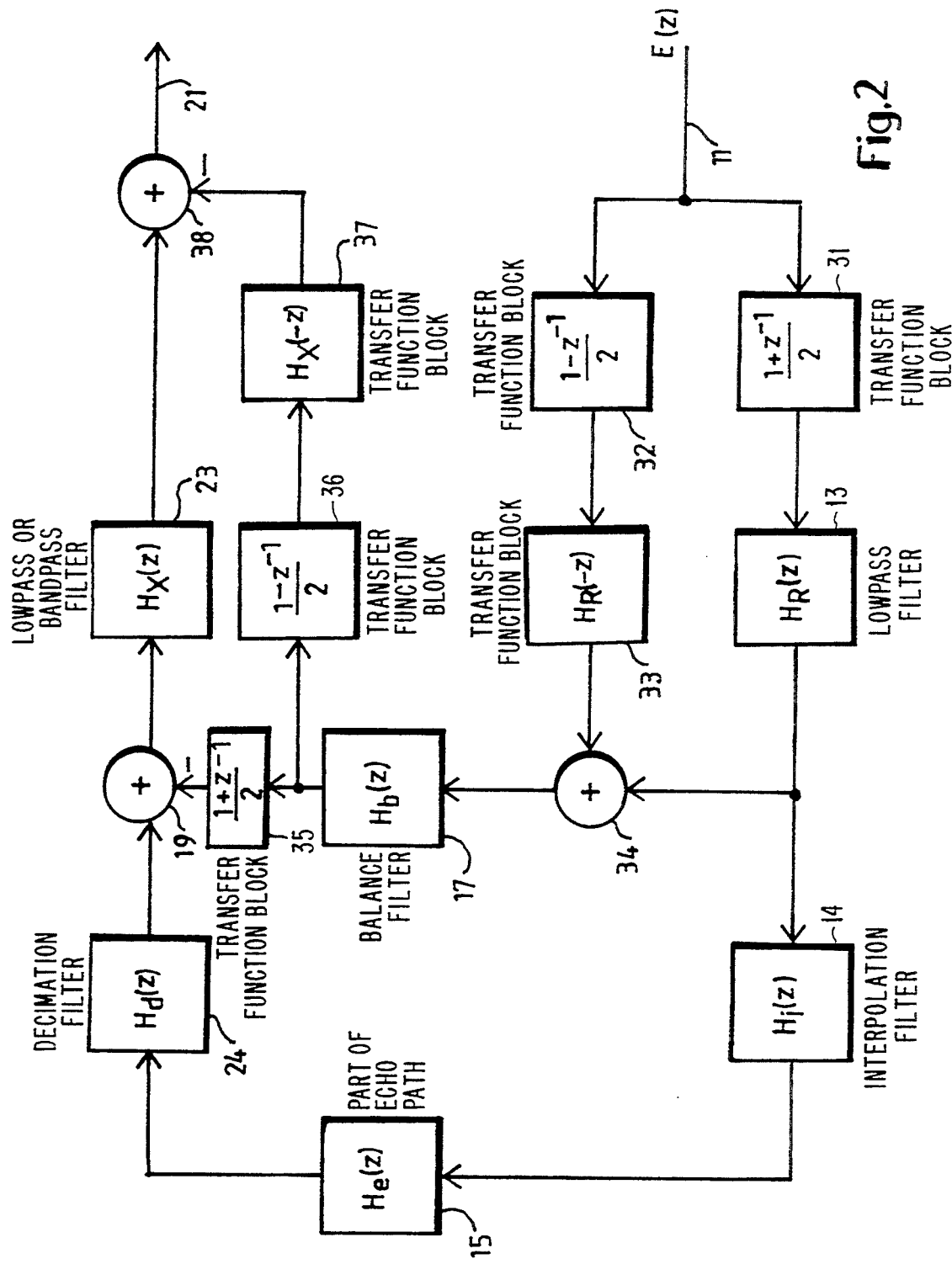
FIG. 2 is an equivalent block schematic illustrating a subscriber line circuit to which the invention is applied.

FIG. 2 illustrates an equivalent block schematic of a subscriber line circuit according to FIG. 1. Accordingly, the blocks which in FIG. 1 mark changes in the clock frequency have, inter alia, been replaced with blocks which represent transfer functions which a received signal E(z) is influenced by mathematically as a result of the changes in clock frequency. Those blocks which are also found in the FIG. 1 illustration have been identified with similar reference signs.

The received signal E(z) passes a block 31 having the transfer function $(1+z^{-1})/2$ and the lowpass filter 13 having the transfer function $H_R(z)$ before it reaches the echo path including the blocks 14, 15 and 24. The signal that reaches the balance filter is equal to $$E(z) \times \left[ \frac{1+z^{-1}}{2} \times H_R(z) + \frac{1-z^{-1}}{2} \times H_R(-z) \right],$$

where the first term is the contribution from the baseband component and the Second term is the contribution from the modulated and thereafter demodulated component. The plus sign in the expression is also corresponded by an addition means 34 in the Figure, and the two factors following the plus sign are corresponded respectively by a block 32 and a block 33. The transfer functions of these blocks coincides with the transfer functions of the blocks 31 and 13 with the exception that z has been replaced with −z.

The increase in sample frequency on the output side of the balance filter 17 and the subsequent decrease in sample frequency downstream of the bandpass filter 23 in the transmission branch 21 results in the same effect as that produced by corresponding sample frequency changes in the receiver branch 11 and on the input side of the balance filter. The equivalent block schematic therefore includes a block 35 having the transfer function $(1+z^{-1})/2$ between the balance filter 17 and the subtraction means 19 and two series-connected blocks 36 and 37 having the respective transfer functions $(1-z^{-1})/2$ and $H_X(-z)$. The signals from these latter two blocks are subtracted from remaining signals in the transmission branch in a subtraction means 38 shown in the Figure, this subtraction corresponding to the addition effected by the means 34 on the input side of the balance filter. The signal obtained from the block 37 is subtracted from the signal in the transmission branch 21 because the output signal of the balance filter is subtracted in the means 19 from the signal in the transmission branch.

The following expression is obtained for a signal in the transmission branch 21 subsequent to echo elimination, i.e. the expression represents the remaining echo signal.

$$E(z) \times \left\{ \frac{1+z^{-1}}{2} \times H_R(z) \times H_i(z) \times H_e(z) \times H_d(z) \times \right.$$

$$H_X(z) - \left[ \frac{1+z^{-1}}{2} \times H_R(z) + \frac{1-z^{-1}}{2} \times H_R(-z) \right] \times$$

$$\left. H_b(z) \times \left[ \frac{1+z^{-1}}{2} \times H_X(z) + \frac{1-z^{-1}}{2} \times H_X(-z) \right] \right\}$$

$$E(z) \times H_R(z) \times H_X(z) \times \frac{1+z^{-1}}{2} \times \left\{ H_i(z) \times H_e(z) \times \right.$$

$$H_d(z) - H_b(z) \times \frac{1-z^{-1}}{2} \times \left[ 1 + \frac{1-z^{-1}}{1+z^{-1}} \times \right.$$

$$\left. \left. \frac{H_R(-z)}{H_R(z)} \right] \times \left[ 1 + \frac{1-z^{-1}}{1+z^{-1}} \times \frac{H_X(-z)}{H_X(z)} \right] \right\}$$

In the latter expression, the factors contained within two square brackets result from the influence of the signal that is formed due to the decrease in clock frequency on the balance filter input and to the increase in clock frequency on the output of said filter. The signal which passes through the balance filter but not through the echo path will give rise to a small error in echo elimination unless attention is paid to the influence of this signal when setting the coefficients of the balance filter. Signals of relatively low frequency give rise to signals of relatively high frequency (8-f) when lowering the sample frequency. These high frequency signals are heavily attenuated in the lowpass filter 13, resulting in a small error in echo elimination. Signals in the frequency band of 3–4 kHz have a relatively high frequency in this context. This results in signals in the frequency band of 4–5 kHz (8-f). Attenuation of these signals, at least in the vicinity of 4 kHz, is only insignificantly greater than attenuation of the baseband signals. The degree of attenuation achieved, however, is sufficiently great for the error in echo elimination to be relatively small, even at these frequencies. In the latter expression above for the remaining echo signal, each of the square brackets contributes an error corresponding to a balance attenuation of about 30 dB. The resultant error therefore corresponds to about 24 dB. This will be true provided that the coefficients of the balance filter are set without taking into account the fact that the balance filter input signal will deviate slightly from the signal delivered to the echo path. The error can be reduced still further, however, by constructing the arrangement such as to take these signals into account when the balance filter coefficients are determined. In this case, the filter coefficients shall be changed slightly in relation to those values which they would otherwise have.

It will be understood that the inventive method can also be applied in connection with other clock frequencies than those recited in the above example. It may also be beneficial to place the balance filter in an interface where the clock frequency is higher than that illustrated in the above example. For example, more interpolation filters and decimation filters may be included in the receiver branch and the transmission branch respectively, and the interface for echo elimination can be chosen so that not all of these filters will be included in the echo path. This results in a delay in the echo path, which enables a shorter balance filter to be used.

I claim:

1. A method for decreasing the necessary size of a digital filter used for echo elimination in a subscriber line circuit having digital signal processing, in which echo elimination is effected in an interface where a sampling frequency is higher than an original sampling frequency of transmitted signals, said method comprising the steps of:

decreasing the sampling frequency on an input side of the digital filter to a sampling frequency equal to said original sampling frequency of transmitted signals, and increasing the sampling frequency on an output side of the digital filter to the sampling frequency used in said interface.

2. An arrangement for decreasing the necessary size of a digital filter used for echo elimination in a subscriber line circuit having digital signal processing, in which echo elimination is effected in an interface where a sampling frequency is higher than an original sampling frequency of transmitted signals, said arrangement comprising:

means for decreasing the sampling frequency on an input side of the filter to a sampling frequency equal to said original sampling frequency of transmitted signals, and means for increasing the sampling frequency on an output side of the filter to the sampling frequency used in said interface.

* * * * *